United States Patent
Shirai (10) Patent No.: US 10,338,211 B2
(45) Date of Patent: Jul. 2, 2019

(54) APPARATUS FOR MEASURING DISTANCE

(71) Applicant: DENSO CORPORATION, Kariya, Aichi-pref. (JP)

(72) Inventor: Noriaki Shirai, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 6 days.

(21) Appl. No.: 15/821,145

(22) Filed: Nov. 22, 2017

(65) Prior Publication Data

US 2018/0143315 A1 May 24, 2018

(30) Foreign Application Priority Data

Nov. 24, 2016 (JP) .................. 2016-227934

(51) Int. Cl.
| | |
|---|---|
| G01S 13/86 | (2006.01) |
| H04N 13/128 | (2018.01) |
| G01S 13/93 | (2006.01) |
| G06T 7/60 | (2017.01) |
| H04N 13/239 | (2018.01) |
| G06T 7/593 | (2017.01) |

(Continued)

(52) U.S. Cl.
CPC .......... *G01S 13/867* (2013.01); *G01S 13/931* (2013.01); *G06T 7/593* (2017.01); *G06T 7/60* (2013.01); *H04N 13/128* (2018.05); *H04N 13/239* (2018.05); *G01S 13/32* (2013.01); *G01S 2013/9367* (2013.01); *G06T 2207/10012* (2013.01); *G06T 2207/10028* (2013.01); *G06T 2207/30261* (2013.01); *H04N 2013/0081* (2013.01)

(58) Field of Classification Search
CPC ...... G01S 13/867; G01S 13/931; G01S 13/32; G01S 2013/9367; G06T 7/593; G06T 7/60; G06T 2207/10012; G06T 2207/10028; G06T 2207/30261; H04N 13/128; H04N 13/239; H04N 2013/0081
USPC ....................................................... 382/106
See application file for complete search history.

(56) References Cited

U.S. PATENT DOCUMENTS

| | | | |
|---|---|---|---|
| 7,499,638 B2 * | 3/2009 | Arai .......................... | G01C 3/18 348/370 |
| 9,866,819 B2 * | 1/2018 | Suzuki .................... | B60R 11/04 |

(Continued)

FOREIGN PATENT DOCUMENTS

| | | |
|---|---|---|
| JP | H10-255020 A | 9/1998 |
| JP | 2013-072839 A | 4/2013 |

(Continued)

*Primary Examiner* — Jonathan S Lee
(74) *Attorney, Agent, or Firm* — Knobbe, Martens, Olson & Bear, LLP (57) ABSTRACT

The distance measuring device detects parallax between right and left captured images where a front object is present ahead of the own vehicle, and calculate a parallax distance between the front object and the own vehicle. The radar device detects a radar detected distance therebetween. The distance measuring device calculates a parallax error based on the difference between the parallax calculated distance and the radar detected distance. A correction region is set in the right captured image and divided into correction divided regions. The distance measuring device sets an individual correction parallax for every correction divided regions, based on the parallax error and the identified correction divided regions.

4 Claims, 4 Drawing Sheets

(51) Int. Cl.
　　　*G01S 13/32*　　　(2006.01)
　　　*H04N 13/00*　　　(2018.01)

(56) References Cited

U.S. PATENT DOCUMENTS

| | | |
|---|---|---|
| 2014/0132769 A1 | 5/2014 | Kido |
| 2015/0002638 A1* | 1/2015 | Suzuki .................... B60R 11/04 |
| | | 348/47 |
| 2015/0042789 A1* | 2/2015 | Inwood ................ G01B 11/026 |
| | | 348/135 |

FOREIGN PATENT DOCUMENTS

| | | |
|---|---|---|
| JP | 5280768 B2 | 9/2013 |
| JP | 2014-096712 A | 5/2014 |

\* cited by examiner

APPARATUS FOR MEASURING DISTANCE

CROSS-REFERENCE TO RELATED APPLICATION

This application is based on and claims the benefit of priority from earlier Japanese Patent Application No. 2016-227934 filed Nov. 24, 2016, the description of which is incorporated herein by reference.

BACKGROUND OF THE INVENTION

Technical Field

The present disclosure relates to a distance measurement apparatus for measuring a distance by using a plurality of images captured from mutually different view points.

Description of the Related Art

Japanese Patent Number 5280768 discloses an apparatus that measures a distance up to an object in two images each captured by two imaging devices mounted on a vehicle, in which a parallax of the object present in the two images is detected based on the two captured images, thereby detecting the distance up to the object.

However, in the case where the above-mentioned two imaging devices are installed in the vehicle cabin for capturing an image ahead of the vehicle, there is a concern that detection accuracy of parallax is lowered due to a distortion of a windshield of the vehicle, thereby causing a degradation of measurement accuracy of the distance.

SUMMARY

An object of the present disclosure is to improve a measurement accuracy of distance.

A first aspect of the present disclosure is a distance measuring device provided with an image acquiring unit, a parallax detection unit, a distance calculation unit, a distance detection unit, an error calculation unit, a first region identifying unit, an individual correction setting unit, a second region identifying unit, and a corrected distance calculation unit.

The image acquiring unit is installed in a vehicle cabin of a vehicle, acquiring a plurality of images which are simultaneously captured from mutually different view points via a windshield of the vehicle, to include a common imaging region ahead of the vehicle which are shared by the plurality of images.

The parallax detection unit detects a parallax between the plurality of images as a detected parallax, when a front object, as an object being present ahead of the vehicle, is captured in the plurality of images, based on positions where the front object is captured in respective images.

The distance calculation unit calculates distance between the front object and the vehicle as a parallax calculated distance based on the detected parallax. The distance detection unit is mounted on the vehicle, transmitting/receiving electromagnetic waves to detect distance between the front object and the vehicle as electromagnetic waves detected distance.

The error calculation unit calculates a parallax error which is an error of the parallax detected by the parallax detection unit, the parallax error being calculated based on a difference between the parallax calculated distance calculated by the distance calculation unit and the electromagnetic waves detected distance detected by the distance detection unit.

The first region identifying unit identifies a correction divided region where the front object corresponding to the parallax error calculated by the error calculation unit is captured, the correction divided region being divided from a correction region which is set in the imaging region of at least one of the plurality of images, the correction region being constituted of a plurality of pixels to correct a parallax.

The individual correction setting unit sets an individual correction parallax for each of the correction divided regions, based on the parallax error calculated by the error calculation unit and the correction divided region identified by the first region identifying unit, the individual correction parallax being used for correcting the parallax calculated distance which is calculated based on the detected parallax.

The second region identifying unit identifies the correction divided region where the front object corresponding to the detected parallax is captured. The corrected distance calculation unit calculates a distance between the front object and the vehicle as a corrected distance, based on the detected parallax and the individual correction parallax identified by the second region identifying unit.

According to the present disclosure, the distance measuring device thus configured sets the individual correction parallax for every correction divided region in the correction region set in an imaging region of an image captured by an image acquiring unit installed in the vehicle cabin through the windshield.

Therefore, the distance measuring unit of the present disclosure is capable correcting the parallax calculated distance depending on variation of the parallax error by using the individual correction parallax set for each of the correction divided regions, even when the parallax error varies in the correction region due to distortion of the windshield of the vehicle, so that a measurement accuracy of the distance can be improved.

It should be noted that the bracketed reference signs in this column and in the claims indicate correspondence to specific means in the embodiments as one aspect which will be described later, and do not limit the technical scope of the present disclosure.

DETAILED DESCRIPTION OF THE PREFERRED EMBODIMENTS

Hereinafter, embodiments of the present disclosure will be described with reference to the drawings.

Figure 1:
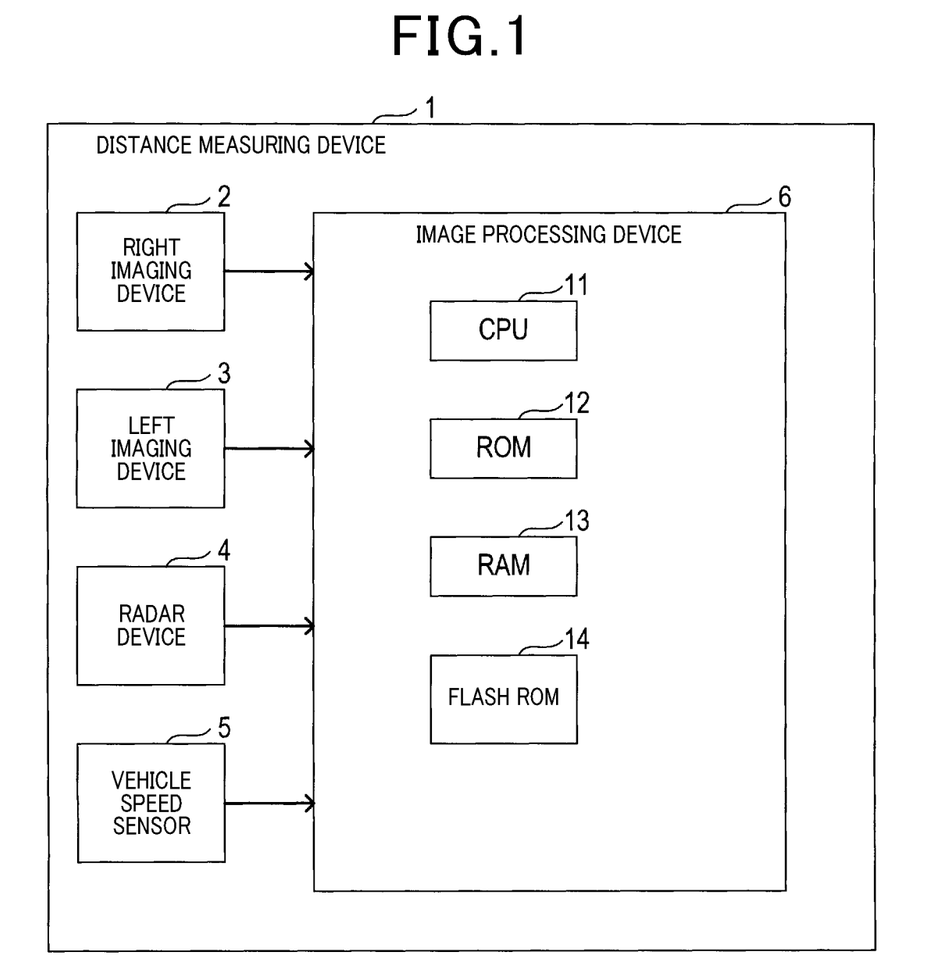
FIG. 1 is a block diagram showing a configuration of a distance measuring apparatus 1.

As shown in FIG. 1, a distance measuring device 1 according to the present embodiment is mounted on a vehicle and provided with a right imaging device 2, a left imaging device 3, a radar device 4, a vehicle speed sensor 5, and image processing device 6. Hereinafter, a vehicle on which the distance measuring device 1 is mounted is referred to as an own vehicle.

The right imaging device 2 and the left imaging device 3 are mounted in the upper portion of the windshield. The right imaging device 2 and the left imaging device 3 are mounted on a right side and a left side with respect to the travelling direction of the own vehicle respectively. The right imaging device 2 and the left imaging device 3 continuously capture scenes ahead of the own vehicle, and output image data indicating the captured images to the image processing device 6. Hereinafter, image data of the right image device 2 is referred to as right image data and image data of the left image device 3 is referred to as left image data. Also, captured image which the right imaging device 2 captures is referred to as right captured image, and captured image which the left imaging device 3 captures is referred to as left captured image.

The right imaging device 2 and the left imaging device 3 are arranged to be in parallel-coordinate. Specifically, the right imaging device 2 and the left imaging device 3 are arranged such that the optical axis of the right imaging device 2 and the optical axis of the left imaging device 3 are parallel. Thus, an imaging surface of the right imaging device 2 and an imaging surface of the left imaging camera 3 are positioned on the same plane. Further, the right imaging device 2 and the left imaging device 3 are separated with a distance specified by a base-line length set in advance along the horizontal direction, such that the horizontal axis of the imaging surface of the right imaging device 2 coincides with the horizontal axis of the imaging surface of the left imaging device 3. The horizontal axis of the imaging surface is defined as X-axis in the two-dimensional orthogonal coordinate system which is defined as having an X-axis and Y-axis.

The radar device 4 is configured as well-known FMCW radar. FMCW is referred to as Frequency Modulated Continuous Wave. The radar device 4 transmits millimeter band radar waves which are frequency-modulated ahead of the own vehicle, and receives the reflected radar waves, thereby detecting distance to an object that reflects the radar waves (hereinafter referred to as object), relative speed between the own vehicle and the object, and azimuth where the object is present. Then, the radar device 4 outputs object information including the distance to the object, the relative speed and azimuth to the image processing device 6. Hereinafter, the distance detected by the radar device 4 is referred to as a radar detection distance.

The vehicle speed sensor 5 detects a travelling speed of the vehicle and outputs a vehicle speed signal indicating the detection result to the image processing device 6. The image processing device 6 is mainly configured of a well-known microcomputer including a CPU 11, a ROM 12, a RAM 13, a flash ROM 14 and a bus which connects these devices. In this example, the ROM 12 corresponds to non-transitory tangible recording media. When executing the program, methods corresponding to the program are executed. It should be noted that a part of the function or the entire function executed by the CPU 11 may be configured as hardware such as a single IC (integrated circuit) or a plurality of ICs or the like. The number of microcomputers that constitute the image processing device 6 may be one or more in number.

In the distance measuring device 1 thus configured, image processing device 6 executes a parallax error correction process and a distance calculation process. The parallax error correction process and the distance calculation process are repeatedly executed in the image processing device 6.

Next, the parallax error correction process will be described.

Figure 2:
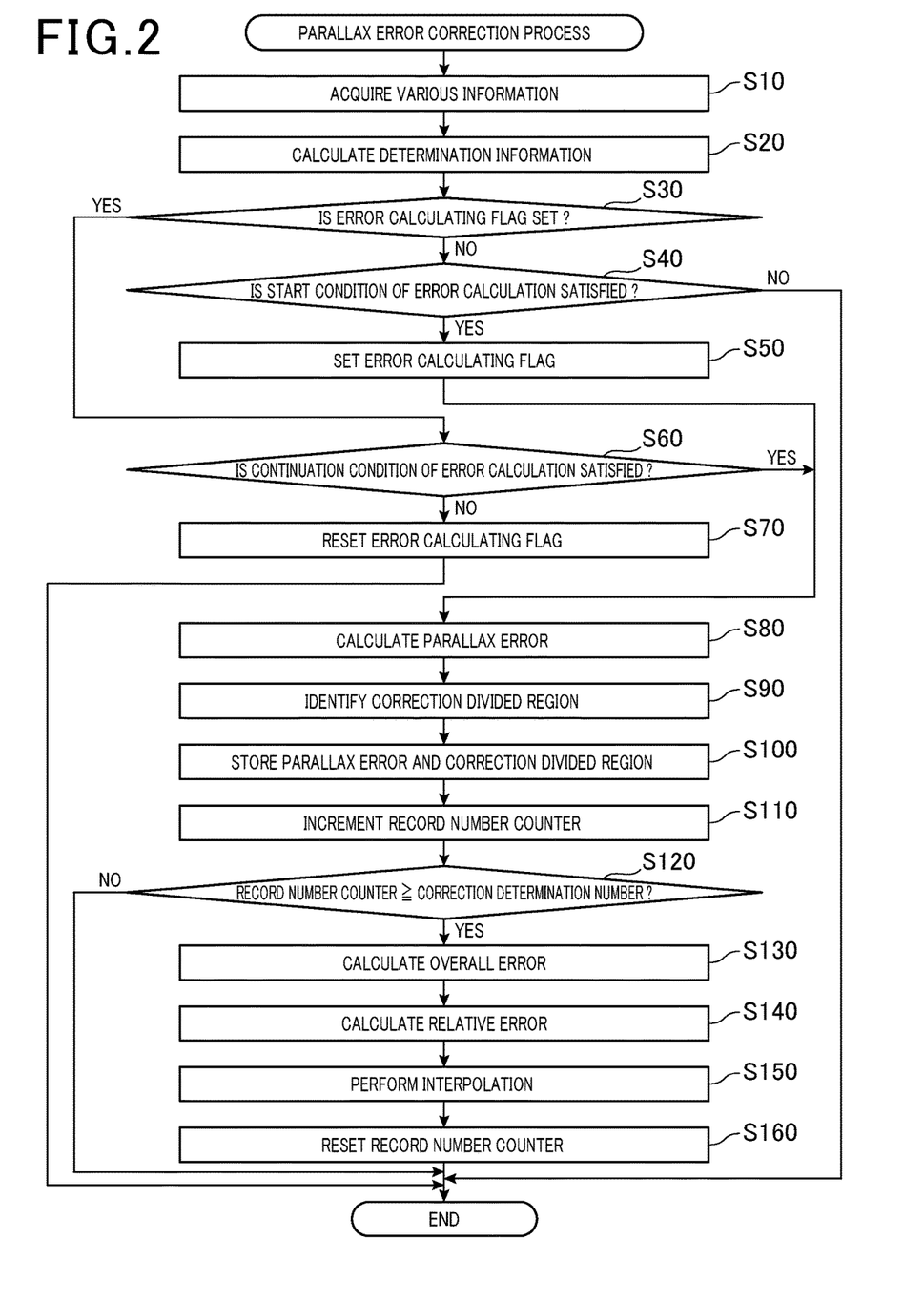
FIG. 2 is a flow chart showing a parallax error correction process.

Once the parallax error correction process is executed, as shown in FIG. 2, the image processing device 6 acquires various information at S10. Specifically, the process acquires the latest two right image data and the left image data which are respectively captured by the right imaging device 2 and the left imaging device 3, the latest object information outputted by the radar device 4, and the latest vehicle speed signal outputted by the vehicle speed sensor 5.

At S20, the process calculates determination information. Namely, an image-calculated relative speed, and a lateral position of the object. The image-calculated relative speed is calculated based on recent two images of the right image data and the left image data acquired at S10. Specifically, the process acquires parallax of the object captured in both of the right captured image and the left captured image indicated respectively by the most recent right image data and the left image data acquired at S10, and the distance (hereinafter referred as parallax calculated distance) to the most recent detected object is calculated, based on the detected parallax, by using a known distance calculation formula using parallax. Further, the process acquires parallax of the object captured in both of the right captured image and the left captured image indicated respectively by the second recent right image data and the left image data, and the distance to the second recent detected object is calculated, based on the detected parallax. As a result, image-calculated relative speed is calculated by a calculation where the distance between the most recent parallax calculated distance and the second recent parallax calculated distance is divided by time-difference between times at which the two parallax calculated distances are calculated.

A lateral position of the object is defined with respect to a vehicle width direction of the own vehicle in which the origin is the center of the own vehicle. The lateral position of the object is calculated based on distance and azimuth of the object extracted from the most recent object information acquired at S10.

Further, at S30, the process determines whether or not an error calculating flag stored in the RAM 13 is set. When the error calculating flag is reset, at S40, the process determines whether or not a start condition of the error calculation is met. According to the present embodiment, the start condition of the error calculation is satisfied when the following 5 conditions are met.

The first condition is that the vehicle speed is a predetermined determination speed (e.g., 15 km/h) or more. The second condition is that the image-calculated relative speed calculated at S20 and the relative speed (hereinafter referred to as radar detected relative speed) detected by the radar device 4 is within the predetermined determination speed (e.g., ±3 km/h). The radar detected relative speed is obtained by extracting information indicating the relative speed from the most resent object information which is acquired at S10.

The third condition is that the lateral position of the object calculated at S20 is within a predetermined lane determination range (e.g., −1.75 m to +1.75 m) where the object is running in the same lane as the own vehicle is running.

The fourth condition is met when the following equation (1) is satisfied. In the following equation (1), $\Delta x_j$ [pixel] is defined as a start determination parallax error which is set to be 0.5 [pixel] in the present embodiment, for example. D[m] is a distance between the optical axis of the right imaging device 2 and the optical axis of the left imaging device 3. f [pixel] is a focal distance of the right imaging device 2 and the left imaging device 3. Note that the focal distance [mm] divided by the pixel pitch is defined as the unit of f. L1 [m] is referred to as a recent parallax calculated distance acquired at S10. L2 [m] is the recent radar detection distance acquired at S10. The radar detection distance is acquired by extracting the information showing a distance to the object from the recent object information acquired at S10.

$$|\Delta xj| \leq D \times fx |(1/L1)-(1/L2)| \tag{1}$$

The fifth condition is that a state where all of the first to fourth conditions are satisfied, continues for a predetermined calculation start determination period (e.g., 1 second).

When the start condition of the error calculation is not satisfied at S40, parallax error correction process is temporarily ended. On the other hand, when the start condition is not satisfied, the error calculating flag is set at S50 and the process proceeds to S80.

At S30, when the error calculating flag is set, the process determines, at S60, whether or not a continuation condition of the error calculation is satisfied. According to the present embodiment, the continuation condition of the error calculation is that all of the above-mentioned first to fourth conditions are satisfied.

Here, when the continuation condition of the error calculation is not met, the process resets the error calculating flag at S70, and the parallax error correction process is temporarily ended. On the other hand, when the continuation condition of the error calculation is satisfied, the process proceeds to S80.

At S80, a parallax error Δx is calculated based on the following equation (2).

$$\Delta x = D \times fx \{(1/L1)-(1-/L2)\} \tag{2}$$

Figure 3:
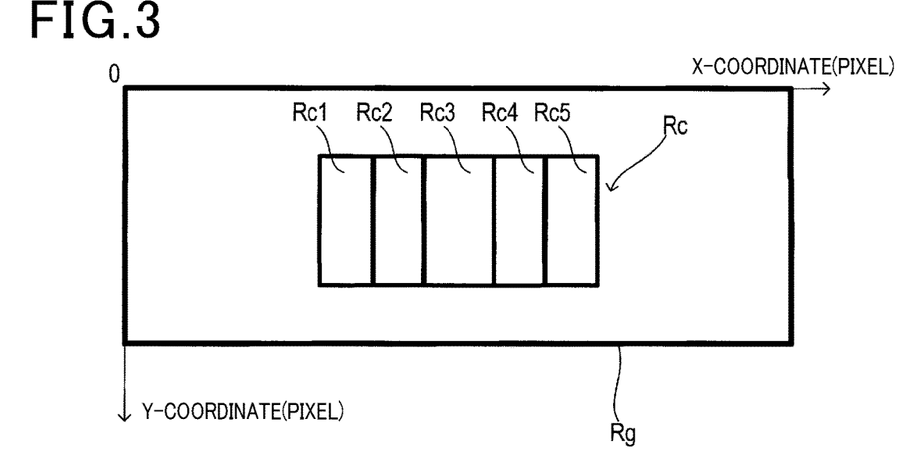
FIG. 3 is an arrangement of correction divided regions Rc1 to Rc5 in a captured image region Rg.

Next at S90, the process identifies correction divided regions (will be described later) corresponding to the parallax error Δx calculated at S80. As shown in FIG. 3, a correction region Rc is set in a center area of the captured image region Rg of the right imaging device 2.

In the captured image region Rg, positions of the respective pixels which constitute the captured image are set relative to the physical coordinate system. The physical coordinate system is defined with respect to an upper left portion of the captured image as the origin such that the positive direction of the X-axis equals to the right direction and the positive direction of the Y-axis equals to the downward direction. Hence, positions of the respective pixels which constitute the captured image are set with pixel unit.

According to the present embodiment, the captured image region Rg is formed in a rectangular shape to have 1280 pixels in the X-axis and 960 pixel in the Y-axis. The correction region Rc is formed in a rectangular shape to have 640 pixels in the X-axis and 480 pixels in the Y-axis.

The correction region Rc is divided by correction divided regions Rc1, Rc2, Rc3, Rc4 and Rc5 located in this order from the left along the X-axis. The correction divided regions Rc1 to Rc5 are formed in a rectangular shape such that each length of the correction divided regions Rc1 to Rc5 in the Y-axis direction is the same as that of the correction region Rc. It should be noted that the lengths thereof in the X-axis direction are set such that the correction divided region Rc3 is located in the center of the correction region Rc.

Figure 4:
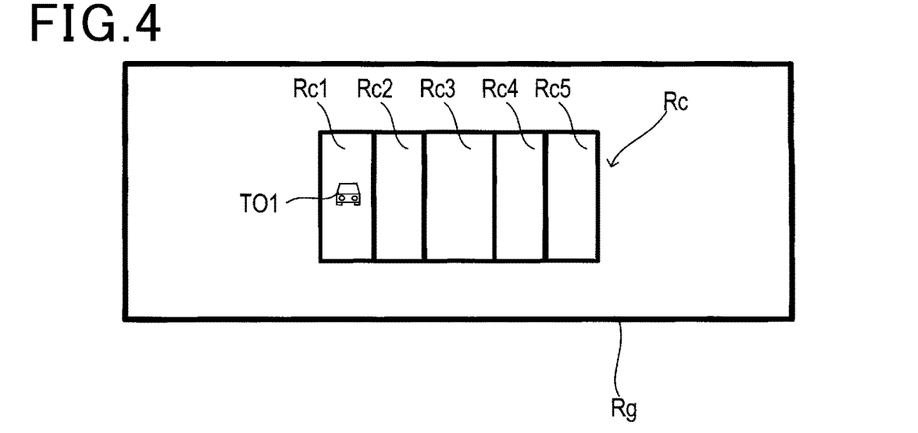
FIG. 4 is a diagram showing state where an object is present in a correction divided region Rc1.
Figure 5:
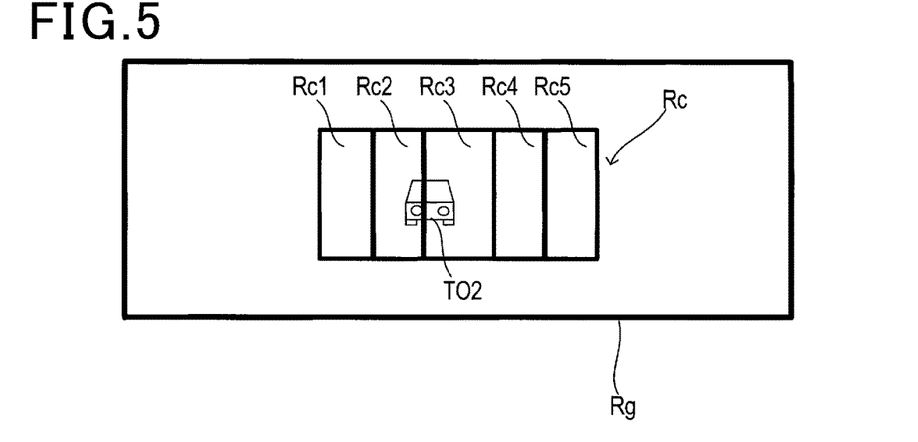
FIG. 5 is diagram showing a state where an object is present in correction divided regions Rc2 and Rc3.

In other words, at S90, the process determines whether or not an object is captured in the correction divided regions Rc1, Rc2, Rc3, Rc4 and Rc5. For example, in the captured image region Rg shown in FIG. 4, it is determined that an object TO1 is present in the correction divided region Rc1. Also, in the captured region Rg shown in FIG. 5, the process determines that an object TO2 is present in the correction divided region Rc2 and the correction divided region Rc3.

When the process at S90 is terminated, as shown in FIG. 2, at step S100, the process correlates, the parallax error Δx calculated at S80 with the information indicating the correction divided region identified at S90, and stores them in the RAM 13. For example, in the captured image region Rg shown FIG. 4, the calculated parallax error Δx and the information showing the correction divided region Rc1 are correlated and stored in the RAM 13. According to the image captured region Rg shown in FIG. 5, the calculated parallax error Δx and the information showing the correction divided regions Rc2 and Rc3 are correlated and stored in the RAM 13.

Then, when the process at S100 is terminated, as shown in FIG. 2, a record number counter stored in the RAM 13 is incremented at S110 (i.e., adding 1). Next, at S120, the process determines whether or not the record number counter (hereinafter referred to as record number) is a predetermined correction determination number or more. According to the present embodiment, the correction determination number is set to be 100, for example. When the record number is less than the correction determination number, the process temporarily terminates the parallax error correction process.

On the other hand, when the record number is determined as the correction determination number or more, at S130, the process calculates an average value of the parallax error Δx of the correction determination number stored in the RAM 13, and the calculated average value is overwritten to overall error stored in the flash ROM 14, thereby updating the overall error.

Next at S140, the process calculates variation of the parallax error in the correction divided regions Rc1 to Rc5. Specifically, the process extracts, among the parallax errors Δx where the number of errors is stored in the RAM13 as the correction determination number, the parallax errors Δx which are correlated to the correction divided region Rc1, thereby calculating the average value of the extracted parallax errors Δx. Similarly, the calculation of the average value is applied to the correction divided regions Rc2 to Rc5. Then, the average value of the correction divided region Rc3 is subtracted from the calculated average, for each of the correction divided regions Rc1 to Rc5. The subtracted value calculated for each of the correction divided regions Rc1 to Rc5 is overwritten and stored as a relative error stored in the flash ROM 14, thereby updating each of the relative errors in the correction divided regions Rc1 to Rc5. It should be noted that the relative error of the correction divided region Rc3 is 0.

Thereafter, at S150, the process calculates, based on a linear interpolation, relative errors for correction divided region in which the relative errors are not calculated at S140, by using the relative errors of the correction divided regions in which the relative errors are calculated. For example, the relative errors of the correction divided regions Rc3, Rc4 and Rc5 are calculated at S140, and the relative errors of the correction divided regions Rc1 and Rc2 are calculated based on a linear interpolation using the relative errors of the correction divided regions Rc3, Rc4, and Rc5 when the relative errors of the correction divided regions Rc1 and Rc2 are not calculated.

At S150, the process overwrites the relative errors calculated based on the linear interpolation for the correction divided regions in which the relative errors are not calculated at S140, into the relative errors stored in the flash ROM 14, thereby updating the relative errors.

At S160, the record number counter is reset (i.e., set to 0), and the process temporarily terminates the parallax error correction process. Next, a process of the distance calculation process will be described.

Figure 6:
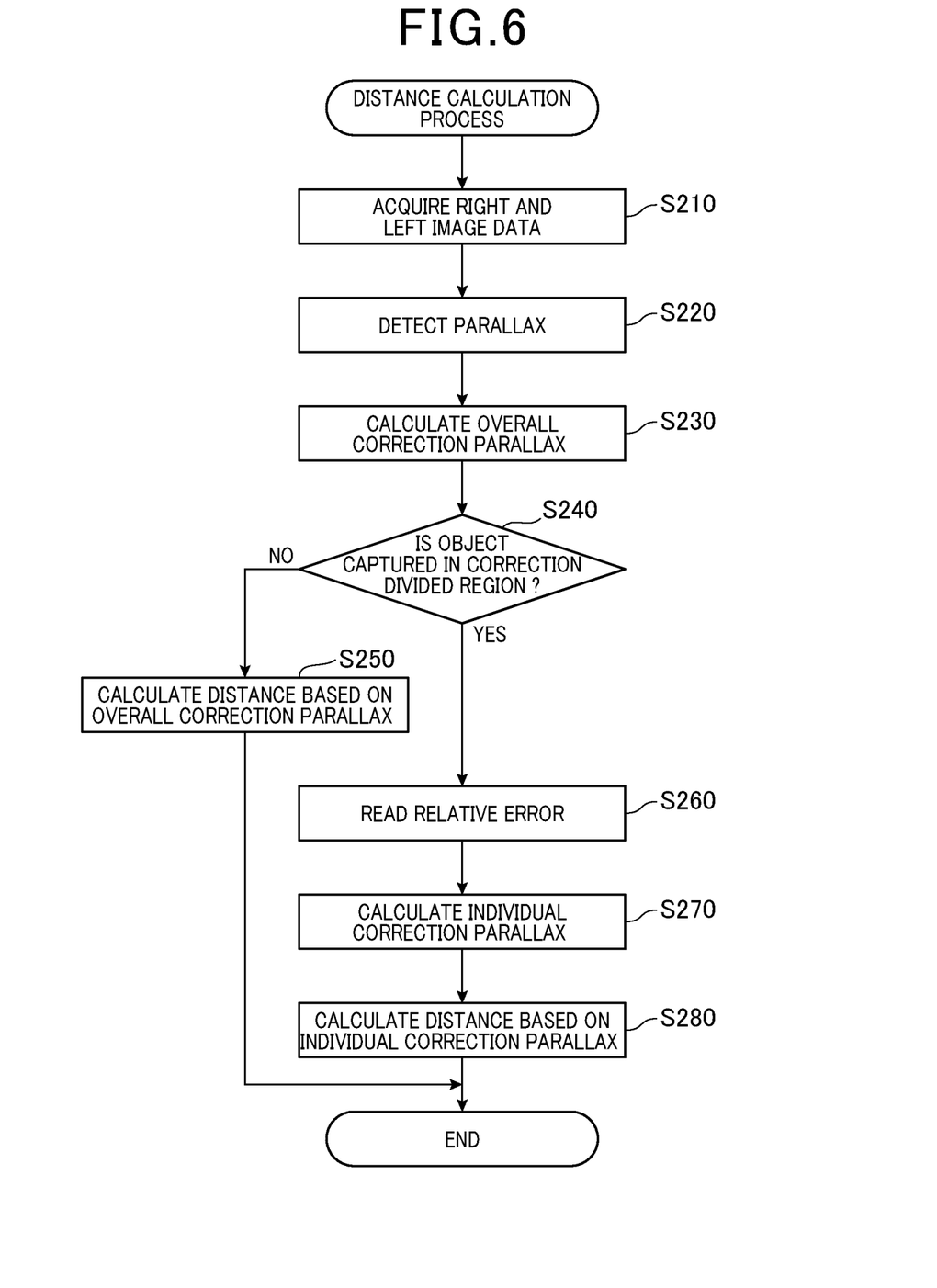
FIG. 6 is a flowchart showing a distance calculation process.

When the distance calculation process is executed, as shown in FIG. 6, the image processing device 6 acquires recent right image data and the left image data captured by the right imaging device 2 and the left imaging device 3 at S210.

Then, at S220, the process detects parallax of the object captured in the both of the right captured image indicated by the right image data acquired at S210 and the left captured image indicated by the left image data acquired at S210. Thereafter, at S230, the process subtracts the overall error stored in the flash ROM14 from the parallax detected at S220 and determines the subtract value to be an overall correction parallax. In other words, when the overall error is positive value, the overall error is subtracted from the parallax detected at S220, and when the overall error is negative, the absolute value of the overall error is added to the parallax detected at S220.

Further, at S240, the process determines whether or not an object is captured in the correction divided regions Rc1 to Rc5 in the right captured image. When the object is not captured in the correction divided regions Rc1 to Rc5, at S250, the process calculates, based on the overall correction parallax calculated at S230, the distance to the object by using a known distance calculation equation, and temporarily terminates the distance calculation process.

On the other hand, when the object is captured in the correction divided regions Rc1 to Rc5, at S260, the process reads from the flash ROM14, the relative error corresponding to the correction divided region where the object is captured. Further, at S270, the process subtracts the relative error read at S260 from the overall correction parallax calculated at S230, and determines the subtracted value to be an individual correction parallax. That is, when the relative error read at S260 is a positive value, the relative error is subtracted from the overall correction parallax, and when the relative error is negative value, an absolute value of the relative error is added to the overall correction parallax.

At S280, the process calculates, based on the individual correction parallax calculated at S270, the distance to the object by using a known distance calculation equation, and temporarily terminates the distance calculation process. The distance measuring device 1 thus configured is provided with the right imaging device 2, the left imaging device 3, and the radar device 4. The right imaging device 2 and the left imaging device 3 are installed in a vehicle-cabin of the own vehicle. The right imaging device 2 and the left imaging device 3 acquires the right captured image and the left captured image which are simultaneously captured from mutually different view points via the windshield of the own vehicle, to include a common imaging region ahead of the own vehicle which are shared by the right and left captured images.

In the case where an object (hereinafter referred to as front object) existing ahead of the own vehicle are captured in the right and left captured images, the distance measuring device 1 detects, based on positions where the front object is captured in respective right and left captured images, the parallax between the right captured image and the left captured image, as a detected parallax.

The distance measuring device 1 calculates the distance between the object and the own vehicle as the parallax calculated distance. The radar device 4 is mounted on the own vehicle. The radar device 4 transmits radar waves and receives reflected waves, thereby detecting the distance between the front object and the own vehicle as a radar detection distance.

The distance measuring device 1 calculates error of the detected parallax (hereinafter referred to as parallax error) based on a difference between the parallax calculated distance and the radar detection distance detected by the radar device 4.

For the right captured image, the correction region Rc is set in the captured image region Rg of the right captured image. The correction region Rc is constituted of a plurality of pixels, and is used for correcting the parallax. The correction region Rc is divided into a plurality of correction divided regions Rc1, Rc2, Rc3, Rc4 and Rc5. The distance measuring device 1 identifies the correction divided regions Rc1 to Rc5, where a front object corresponding to the calculated parallax error is captured.

The distance measuring device 1 sets, based on the calculated parallax error and the identified correction divided regions Rc1 to Rc5, an individual correction parallax for each of the correction divided regions Rc1 to Rc5. The individual correction parallax is used for correcting the parallax calculated distance calculated based on the detected parallax. The individual correction parallax is defined as an additional value having inverted polarity, the additional value is sum of the overall correction parallax and the relative errors which are set for each of the correction divided regions Rc1 to Rc5 are added.

The distance measuring device 1 calculates, based on the detected parallax and the individual correction parallax corresponding to the identified correction divided regions Rc1 to Rc5, the distance between the front object and the own vehicle as the corrected distance.

Thus, the distance measuring device 1 sets the individual correction parallax for each of the correction divided regions Rc1 to Rc5 in the correction region Rc which is set in the captured image region Rg of the right captured image. The right captured image is captured by the right imaging device 2 installed in the vehicle cabin of the own vehicle, through the windshield of the own vehicle.

Hence, since the distance measuring device 1 is able to correct the parallax calculated distance depending on variation of the parallax error by using the individual correction parallax set for each of the correction divided regions Rc1 to Rc5, even when the parallax error varies in the correction region Rc due to distortion of the windshield of the own vehicle, a measurement accuracy of the distance can be improved.

Further, a dedicated calibration for the stereo camera is not required when the own vehicle is shipped from a vehicle factory or the own vehicle is adjusted in a maintenance facility. However, the parallax calculated distance can be corrected based on the variation of the parallax error due to production tolerance The distance measuring device 1 sets, based on the identified correction divided regions Rc1 to Rc5, the overall correction parallax used for correcting the parallax calculated distance calculated in accordance with the detected parallax, for the entire correction region Rc.

Thus, even when the front object is captured in the correction divided regions Rc1 to Rc5 in which the relative errors are not set in the corrected region Rc, the distance measuring device 1 can correct the parallax calculated distance of the front object by using at least the overall correction parallax so that the measurement accuracy of the distance can be prevented from being lowered.

In the case where the correction divided regions Rc1 to Rc5 are present where no relative errors are set, the distance measuring device 1 performs an interpolation based on the relative errors of the correction divided regions Rc1 to Rc5 where the relative errors are set so as to set the relative errors for the correction divided regions Rc1 to Rc5 where no relative errors are set.

Thus, the distance measuring device 1 can correct the parallax calculated distance of the front object by using the individual correction parallax which are set with the interpolation, even when the front object is captured in the correction divided regions Rc1 to Rc5 where the relative errors are not set in the correction region Rc. Accordingly, the measurement accuracy of the distance can be prevented from being lowered.

Also, the distance measuring device 1 inhibits calculation of the parallax error when a predetermined calculation inhibit condition is satisfied. The calculation inhibit condition indicates that the parallax error calculated based on the difference between the parallax calculated distance L1 and the radar detection distance L2 becomes large. The calculation inhibit condition is that the above-described forth condition is not met.

Thus, even when the parallax error becomes large due to a fault on the right imaging device 2 and the left imaging device 3 for example, the distance measuring device 1 can avoid a case where the individual correction parallax or the overall correction parallax are set using the large parallax error. Hence, a measurement accuracy of the distance can be prevented from being lowered.

According to the embodiments described above, the distance measuring device 1 corresponds to distance measuring device, and the right imaging device 2 and the left imaging device 3 correspond to image acquiring unit, steps S20 and S220 correspond to a process of a parallax detection unit, and S20 corresponds to a process of a distance calculation unit.

The radar device 4 corresponds to a process of a distance detection unit, steps S30 to S80 correspond to processes of an error calculation unit, and S90 corresponds to a process of a first region identifying unit, and steps S100 to S140 correspond to processes of an individual correction setting unit.

Step S240 corresponds to a process of a second region identifying unit, steps S230, S260 to S280 correspond to processes of a corrected distance calculation unit, the right captured image and the left captured image correspond to a plurality of captured images, the front object corresponds to a front object, the radar waves correspond to the electromagnetic waves, and the radar detection distance corresponds to electromagnetic waves detected distance.

S130 corresponds to a process of a overall correction setting unit, and S150 corresponds to a process of an interpolation unit. An embodiment of the present disclosure has been described so far. The present disclosure is not limited to the above-described embodiment, and can be modified in various ways.

[Modification 1]

For example, according to the above-described embodiment, the process extracts each of the parallax errors Δx corresponding to the correction divided regions Rc1 to Rc5 and calculates an average value of the extracted parallax errors Δx. However, the process may exclude parallax errors of which the value significantly deviates from the average value, and thereafter may calculate the average value.

According to the above-described embodiments, at S150, the process calculates, based on a linear interpolation, a relative error of the correction divided region where the relative error is not calculated at S140, by using a relative error of the correction divided region where the relative error is calculated. However, for the correction divided region where a relative error is not calculated, a relative error can be the same relative error as an adjacent correction divided region. For example, in the case where the relative errors are calculated for the correction divided regions Rc3, Rc4 and Rc5, and the relative errors are not calculated for the correction divided regions Rc1 and Rc2, the relative errors of the correction divided regions Rc1 and Rc2 may be set to 0.

[Modification 3]

According to the above-described embodiments, overall error is set at S130 and the relative errors are set at S140, for respective correction divided regions Rc1 to Rc5. However, without setting the overall error, an additional value of which the polarity is inverted, can be set to the correction divided regions Rc1 to Rc5. The additional value is defined as a sum of the overall error and the relative error.

[Modification 4]

According to the above-described embodiments, radar waves are used for detecting an object. However, laser light may be used for detecting an object.

A plurality of functions included in a single element of the above-described embodiments may be achieved by a plurality of elements, or one function included in a single element may be achieved by a plurality of elements. A plurality of functions included in a plurality of elements may be achieved by a single element, or a function achieved by a plurality of elements may be achieved by a single element. Also, a part of configurations of the above-described embodiments can be omitted. At least part of the above-described configuration may be added to other configuration of the above-described embodiments, or may replace other configuration of the above-described embodiments. It should be noted that various aspects inherent in the technical ideas identified by the scope of claims are defined as embodiments of the present disclosure.

Other than the above described distance measuring device 1, the present disclosure can be embodied with various ways, such as a system having the distance measuring device 1 as an element thereof, a program executed on a computer as the distance measuring device 1, a recording media in which the program is stored, and a distance measuring method.

What is claimed is:

1. A distance measuring device comprising:
an image acquiring unit installed in a vehicle cabin of a vehicle, acquiring a plurality of images which are simultaneously captured from mutually different view points via a windshield of the vehicle, to include a common imaging region ahead of the vehicle which are shared by the plurality of images;
a parallax detection unit that detects a parallax between the plurality of images as a detected parallax, in response to a front object, as an object present ahead of the vehicle, being captured in the plurality of images, based on positions where the front object is captured in respective images;

a distance calculation unit that calculates distance between the front object and the vehicle as a parallax calculated distance based on the detected parallax;

a distance detection unit mounted on the vehicle, transmitting/receiving electromagnetic waves to detect distance between the front object and the vehicle as electromagnetic waves detected distance;

an error calculation unit that calculates a parallax error which is an error of the parallax detected by the parallax detection unit, the parallax error being calculated based on a difference between the parallax calculated distance calculated by the distance calculation unit and the electromagnetic waves detected distance detected by the distance detection unit;

a first region identifying unit that identifies a correction divided region where the front object corresponding to the parallax error calculated by the error calculation unit is captured, the correction divided region being divided from a correction region which is set in the imaging region of at least one of the plurality of images, the correction region being constituted of a plurality of pixels to correct a parallax;

an individual correction setting unit that sets an individual correction parallax for each of the correction divided regions, based on the parallax error calculated by the error calculation unit and the correction divided region identified by the first region identifying unit, the individual correction parallax being used for correcting the parallax calculated distance which is calculated based on the detected parallax;

a second region identifying unit that identifies the correction divided region where the front object corresponding to the detected parallax is captured;

a corrected distance calculation unit that calculates a distance between the front object and the vehicle as a corrected distance, based on the detected parallax and the individual correction parallax identified by the second region identifying unit.

2. The distance measuring device according to claim 1, wherein the distance measuring device includes an overall correction setting unit that sets an overall correction parallax used for correcting the parallax calculated distance calculated based on the detected parallax in an overall area of the correction region, in accordance with the parallax error calculated by the error calculation unit and the correction divided region identified by the first region identifying unit.

3. The distance measuring device according to claim 1, wherein the distance measuring device includes an interpolation unit that performs an interpolation for a correction divided region where no individual correction parallax is set by the individual correction setting unit, based on the individual correction parallax which is set in the correction divided region by the individual correction setting unit, thereby setting the individual correction parallax in the correction divided region where no individual correction parallax is set.

4. The distance measuring device according to claim 1, wherein the error calculation unit inhibits calculation of the parallax error in response to a predetermined calculation inhibit condition being satisfied, the predetermined calculation condition indicating a large parallax error which is calculated by the error calculation unit based on a difference between the parallax calculated distance and the electromagnetic waves detected distance.

* * * * *